(12) United States Patent
You et al.

(10) Patent No.: US 8,228,465 B2
(45) Date of Patent: *Jul. 24, 2012

(54) WHITE PHOSPHOR, LIGHT EMISSION DEVICE INCLUDING THE SAME, AND LIQUID CRYSTAL DISPLAY DEVICE INCLUDING THE LIGHT EMISSION DEVICE AS BACKLIGHT UNIT

(75) Inventors: Yong-Chan You, Suwon-si (KR);
Jae-Woo Bae, Suwon-si (KR);
Gyeong-Jae Heo, Suwon-si (KR);
Kyu-Chan Park, Suwon-si (KR);
Sang-Hyuk Lee, Suwon-si (KR);
Sun-Hwa Kwon, Suwon-si (KR);
Ji-Hyun Kim, Suwon-si (KR); Ui-Song Do, Suwon-si (KR); Young-Suk Cho, Suwon-si (KR); Byung-Kyun Kim, Suwon-si (KR); Hui-Young Ku, Suwon-si (KR); Yoo-Jung Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 993 days.

This patent is subject to a terminal disclaimer.

(21) Appl. No.: 12/199,209

(22) Filed: Aug. 27, 2008

(65) Prior Publication Data

US 2009/0135339 A1 May 28, 2009

(30) Foreign Application Priority Data

Nov. 28, 2007 (KR) .................. 10-2007-0122271

(51) Int. Cl.
*G02F 1/1335* (2006.01)

(52) U.S. Cl. ............... 349/69; 349/62; 349/63; 349/64; 349/65; 349/66; 349/67; 349/68

(58) Field of Classification Search ............... 349/62–69
See application file for complete search history.

(56) References Cited

U.S. PATENT DOCUMENTS

| | | | |
|---|---|---|---|
| 5,808,409 | A | 9/1998 | Matsuda et al. |
| 6,875,372 | B1 | 4/2005 | Hampden-Smith et al. |
| 7,476,337 | B2 | 1/2009 | Sakane et al. |
| 7,476,338 | B2 | 1/2009 | Sakane et al. |
| 2005/0012447 | A1 | 1/2005 | Komatsu et al. |

FOREIGN PATENT DOCUMENTS

| | | |
|---|---|---|
| EP | 0 148 110 | 7/1985 |
| EP | 1 273 645 | 1/2003 |
| GB | 2 144 445 | 3/1985 |

(Continued)

OTHER PUBLICATIONS

English Abstract for Korean Publication No. 10-2002-0072868.

(Continued)

*Primary Examiner* — Phu Vu
(74) *Attorney, Agent, or Firm* — Christie, Parker & Hale, LLP

(57) ABSTRACT

A white phosphor including: 40 to 50 parts by weight of a blue phosphor selected from the group consisting of ZnS:(Ag,Cl), ZnS:(Ag,Al), ZnS:(Ag,Al,Cl), and a combination thereof; 20 to 30 parts by weight of a green phosphor $(Sr_{1-x}Ca_x)Ga_2S_4$:Eu ($0 \leq x < 0.2$); and 20 to 30 parts by weight of a red phosphor selected from the group consisting of $Y_2O_3$:Eu, $Y_2O_3$:(Eu, Tb), $Y_2O_2S$:Eu, $Y_2O_2S$:(Eu,Tb), and combinations thereof. The white phosphor can be included in a light emission device. The light emission device can be included in a liquid crystal display.

20 Claims, 7 Drawing Sheets

FOREIGN PATENT DOCUMENTS

| | | |
|---|---|---|
| JP | 2005-194340 | 7/2005 |
| KR | 2004-0093374 | 11/2004 |
| KR | 2006-46707 | 5/2006 |
| KR | 2007-75552 | 7/2007 |
| KR | 10-0768177 | 10/2007 |

OTHER PUBLICATIONS

Office Action issued in corresponding European Patent Application No. 08168571.1 dated Jan. 27, 2009.

U.S. Appl. No. 12/199,232, filed Aug. 27, 2008, Yong-Chan You et al., Samsung SDI Co., Ltd.

WHITE PHOSPHOR, LIGHT EMISSION DEVICE INCLUDING THE SAME, AND LIQUID CRYSTAL DISPLAY DEVICE INCLUDING THE LIGHT EMISSION DEVICE AS BACKLIGHT UNIT

CROSS-REFERENCE TO RELATED APPLICATIONS

This application claims priority to and the benefit of Korean Patent Application No. 2007-122271, filed in the Korean Intellectual Property Office on Nov. 28, 2007, the entire disclosure of which is incorporated herein, by reference.

BACKGROUND OF THE INVENTION

1. Field of the Invention

Aspects of the present invention relate to a white phosphor, a light emission device including the same, and a liquid crystal display (LCD) including the light emission device as a backlight unit.

2. Description of the Related Art

A liquid crystal display is a type of flat panel display device that displays an image by varying a light transmission amount of pixels, using dielectric anisotropy to vary the orientation of liquid crystals, according to a voltage applied. A liquid crystal display is lighter, smaller, and uses less power than a conventional cathode ray tube.

A liquid crystal display includes a liquid crystal (LC) panel assembly and a backlight unit. The backlight unit projects light to the LC panel assembly, and the LC panel assembly selectively transmits the light, using a liquid crystal layer.

A backlight unit is classified according to the type of light source included therein, for example, a cold cathode fluorescent lamp (CCFL). Since a CCFL uses a line light source, light emitted from CCFL should be dispersed toward a liquid crystal panel assembly, through optical members, such as a diffuser sheet, a diffuser, and a prism sheet.

However, since the light emitted from CCFL may be absorbed by the optical members, high-intensity light is generally used, resulting in high power consumption. It is also difficult to produce a large-sized liquid crystal display (over 30-inchs), due to structural limitations.

An LED-type backlight unit employing light emitting diodes (LEDs) is also well known. A LED is a spot light source, and thus, an LED-type backlight unit generally includes a plurality of LEDs. An LED-type backlight unit has a fast response time and good color reproduction. However, an LED-type backlight unit is costly and increases an overall thickness of a liquid crystal display.

As described above, all of the conventional backlight units, including the field emission type backlight unit, have inherent problems. In addition, conventional backlight units are driven so as to maintain a predetermined brightness all over a light emission surface, when the liquid crystal display is driven. Therefore, it is difficult to significantly improve image quality.

For example, when a LC panel assembly displays a high contrast image, it will be possible to realize an image having an improved dynamic contrast, if the backlight unit could locally emit different intensities of light to pixels of the LC panel assembly. However, conventional backlight units cannot achieve the above function, and thus, there is a limitation in the dynamic contrast of an image.

SUMMARY OF THE INVENTION

One exemplary embodiment of the present invention provides a white phosphor including components at a predetermined ratio, in order to produce an appropriate color temperature.

Another exemplary embodiment of the present invention provides a light emission device including the white phosphor.

Another exemplary embodiment of the present invention provides a display device including the light emission device as a backlight unit.

According to an exemplary embodiment of the present invention, provided is a white phosphor that includes: 40 to 50 parts by weight of a blue phosphor selected from the group consisting of ZnS:(Ag,Cl), ZnS:(Ag,Al), ZnS:(Ag,Al,Cl), and combinations thereof; 20 to 30 parts by weight of a green phosphor (Sr1-xCax)Ga$_2$S$_4$:Eu ($0 \leq x < 0.2$) ($0 \leq x < 0.2$); and 20 to 30 parts by weight of a red phosphor selected from the group consisting of Y$_2$O$_3$:Eu, Y$_2$O$_3$:(Eu,Tb), Y$_2$O$_2$S:Eu, Y$_2$O$_2$S:(Eu,Tb), and combinations thereof.

According to another exemplary embodiment of the present invention, provided is a light emission device that includes: opposing first and second substrates; an electron emission unit disposed on one surface of the first substrate; and a light emission unit disposed on one surface of the second substrate. The light emission unit includes a phosphor layer disposed on one surface of the second substrate. The phosphor layer includes the white phosphor.

According to yet another exemplary embodiment of the present invention, provided is a liquid crystal display (LCD) that includes the light emission device and a liquid crystal panel assembly disposed in front of the light emission device, to selectively transmit light emitted from the light emission device, so as to display an image.

According to aspects of the present invention, the white phosphor can be prepared by mixing a blue phosphor, a deep green phosphor, and a red phosphor at a predetermined ratio, so as to have having an appropriate color temperature. The deep green phosphor can enlarge the color reproduction range of the white phosphor.

According to aspects of the present invention, the light emission device can improve the color reproduction characteristics of a light emission device.

According to aspects of the present invention, the light emission device can improve the image quality of a liquid crystal display (LCD).

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EXEMPLARY EMBODIMENTS

Figure 1:
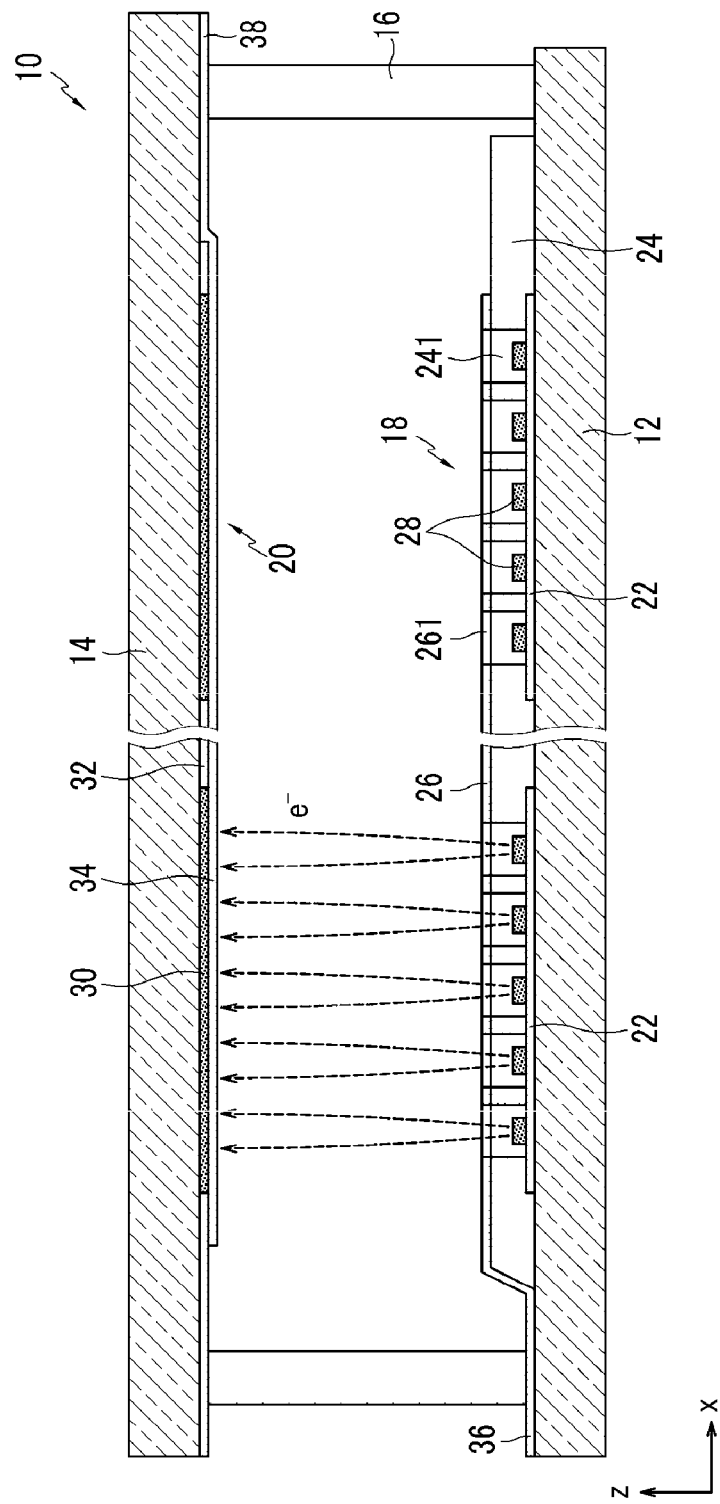
FIG. 1 is a sectional view of a light emission device, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

As referred to herein, when a first element is said to be disposed or formed "on", or "adjacent to", a second element, the first element can directly contact the second element, or can be separated from the second element by one or more other elements located therebetween. In contrast, when an element is referred to as being disposed or formed "directly on" another element, there are no intervening elements present. As used herein, the term "and/or" includes any and all combinations of one or more of the associated listed items.

A white phosphor, according to one exemplary embodiment of the present invention, includes: 40 to 50 parts by weight of a blue phosphor selected from the group consisting of ZnS:(Ag,Cl), ZnS:(Ag,Al), ZnS:(Ag,Al,Cl), and combinations thereof; 20 to 30 parts by weight of a green phosphor $(Sr1-xCax)Ga_2S_4$:Eu ($0 \leqq x < 0.2$); and 20 to 30 parts by weight of a red phosphor selected from the group consisting of $Y_2O_3$:Eu, $Y_2O_3$:(Eu,Tb), $Y_2O_2S$:Eu, $Y_2O_2S$:(Eu,Tb), and combinations thereof.

In one exemplary embodiment, the white phosphor includes 45 to 50 parts by weight of a blue phosphor, 22 to 29 parts by weight of a green phosphor, and 22 to 29 parts by weight of a red phosphor. In another exemplary embodiment, the white phosphor includes 46 to 49 parts by weight of a blue phosphor, 23 to 28 parts by weight of a green phosphor, and 24 to 29 parts by weight of a red phosphor.

When the content of the blue phosphor exceeds the upper limit of the weight range, the color temperature increases, but the luminance decreases. When the content of the green phosphor exceeds the upper limit of the weight range, the luminance increases, the color temperature decreases, and a greenish white color is produced. When the content of the red phosphor exceeds the upper limit of the weight range, the luminance decreases, and a reddish white color is produced, which thereby decreases the color temperature.

When the content of the blue phosphor is less than the lower limit of the weight range, the luminance increases, but the color temperature decreases. When the content of the green phosphor is less than the lower limit of the weight range, the luminance decreases, and the color temperature increases. When the content of the red phosphor is less than the lower limit of the weight range, a greenish white color is produced.

The white phosphor generally has a color temperature ranging from 10,000 to 13,000K. In one exemplary embodiment of the present invention, the luminance and color temperature of the white phosphor can be optimally adjusted, by simulating a mixing ratio of red, green, and blue phosphors having a predetermined color coordinate and luminance. A mixing ratio of the red, green, and blue phosphors can also be defined using a color difference, as well as the luminance and color temperature of the white phosphor.

When the white phosphor, including 46 to 49 parts by weight of the blue phosphor, 23 to 28 parts by weight of the green phosphor, and 24 to 29 parts by weight of the red phosphor, is excited by electron beams, the white phosphor has a color temperature ranging from 10,000 to 13,000K.

When the white phosphor, including 46.9 to 48.5 parts by weight of the blue phosphor, 24.7 to 27.8 parts by weight of the green phosphor, and 25.3 to 26.9 parts by weight of the red phosphor, is excited by electron beams, the white phosphor has a color temperature ranging from 10,200 to 11,000K.

When the white phosphor, including 47.1 to 47.5 parts by weight of the blue phosphor, 23.1 to 27.8 parts by weight of the green phosphor, and 24.6 to 29.2 parts by weight of the red phosphor, is excited by electron beams, the white phosphor has a color temperature ranging from 11,000 to 12,000K.

A light emission device, according to one exemplary embodiment of the present invention, includes first and second substrates arranged opposite to each other; a light emission unit disposed on one surface of the first substrate; and a light emission unit disposed on one surface of the second substrate. The light emission unit includes a phosphor layer disposed on one surface of the second substrate. The phosphor layer includes the above white phosphor.

A liquid crystal display (LCD), according to one exemplary embodiment of the present invention, includes the above light emission device and a liquid crystal panel assembly disposed on the front of the light emission device. The panel assembly selectively transmits light emitted from the light emission device, to display an image.

Figure 2:
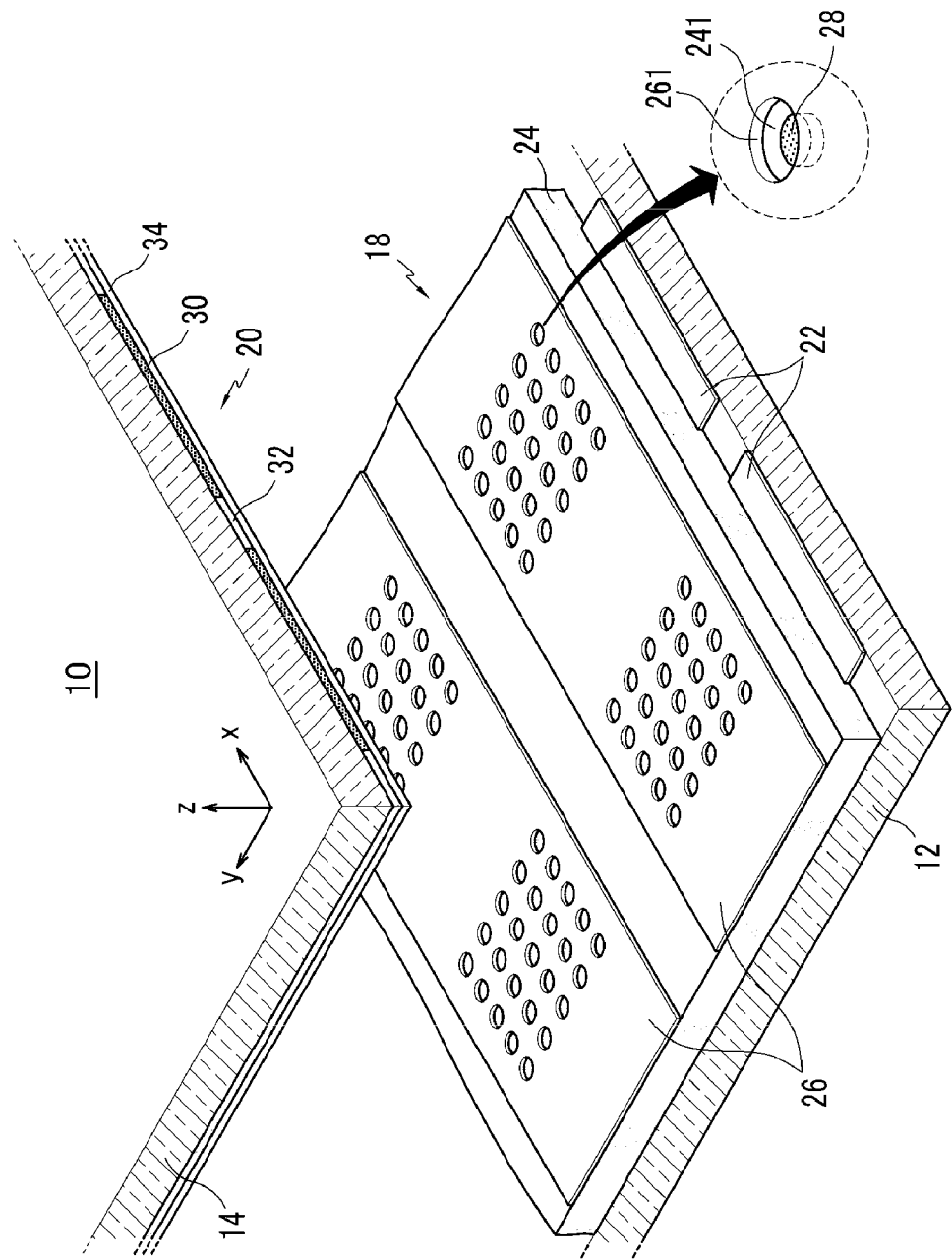
FIG. 2 is a partial exploded perspective view of the light emission device of FIG. 1.

FIG. 1 is a sectional view of a light emission device, according to an exemplary embodiment of the present invention, and FIG. 2 is a partial exploded perspective view of the light emission device of FIG. 1.

Referring to FIG. 1, a light emission device 10 includes opposing first and second substrates 12 and 14 that are spaced apart at a predetermined interval. A sealing member 16 is provided at the peripheries of the first and second substrates 12 and 14, to seal them together, and thus, form a sealed envelope. The interior of the sealed envelope is at a vacuum of about 10–6 Torr.

Each of the first and second substrates 12 and 14 has an active area that emits visible light and an inactive area that surrounds the active area, both or which are disposed within the seal member 16. An electron emission unit 18 to emit electrons is provided on the active area of the first substrate 12. A light emission unit 20 to emit visible light is proved on the active area of the second substrate 14.

Referring to FIG. 2, the electron emission unit 18 includes: cathodes 22 (first electrodes) arranged in a striped pattern along one direction of the first substrate 12; gate electrodes 26 (second electrodes) arranged in a striped pattern across the cathodes 22; an insulating layer 24 arranged between the cathodes 22 and the gate electrodes 26; and electron emission regions 28 electrically connected to the cathodes 22.

The cathodes 22 can be arranged in rows along the first substrate 12 and can be referred to as scan electrodes. Alternatively, the cathodes 22 can be arranged in columns along the first substrate 12 and can be referred to as data electrodes.

Openings 261 and 241 are formed through the insulating layer 24 and the gate electrode 26, respectively, where the cathodes 22 and gate electrodes 26 cross. The openings 261 and 241 are overlapped, to partially expose the cathodes 22. The electron emission regions 28 are electrically connected to the cathodes 22 and are exposed by the openings 261 and 241.

The electron emission regions 28 are formed of a material that emits electrons when an electric field is applied thereto, under a vacuum atmosphere, such as a carbon-based material, or a nanometer-sized material. The electron emission regions 28 can be formed of carbon nanotubes, graphite, graphite nanofibers, diamonds, diamond-like carbon, fullerene, silicon nanowires, or a combination thereof. The electron emission regions 28 can be formed through a screen-printing process, a direct growth process, a chemical vapor deposition process, or a sputtering process. Alternatively, the electron emission regions 28 can be tip-shaped structures formed of a Mo-based, or a Si-based, material.

One crossing region of the cathode 22 and gate electrode 26 may correspond to one pixel region of the light emission device 10. Alternatively, two or more crossing regions of the cathode 22 and gate electrode 26 may correspond to one pixel region of the light emission device 10. In this exemplary embodiment, two or more cathodes 22 and/or two or more gate electrodes 26 that are placed in one pixel region are electrically connected to each other, to receive a common driving voltage.

The light emission unit 20 includes phosphor layers 30 that are spaced apart in a predetermined pattern on one surface of the second substrate 14. Dark colored layers 32 are disposed between the phosphor layers 30. Metallic reflective layers 34 are disposed on the phosphor layers 30 and dark colored layers 32. The light emission unit 20 may not includes the dark colored layers 32. The phosphor layers may be formed on the entire surface of the second substrate 14, without the dark colored layer 32 being disposed between the phosphor layers 30.

The metallic reflective layer 34 may be used as an anode. When the metallic reflective layer 34 is used as an anode, it becomes an acceleration electrode that receives a high voltage to maintain the phosphor layer 30 at a high electric potential. The metallic reflective layer 34 enhances the luminance, by reflecting the visible light, which is emitted from the phosphor layers 30 toward the first substrate 12, toward the second substrate 14.

According to one exemplary embodiment, the anode is a transparent conductive layer formed of ITO (indium tin oxide). The transparent conductive layer is arranged between the second substrate 14 and phosphor layers 30, and may include multiple layers disposed in a predetermined pattern. According to another exemplary embodiment, the both transparent conductive layer and the metallic reflective layer 34 may operate as an anode.

The phosphor layers 30 include a white phosphor that emits white light. The white phosphor includes 40 to 50 parts by weight of a blue phosphor selected from the group consisting of ZnS:(Ag,Cl), ZnS:(Ag,Al), ZnS:(Ag,Al,Cl), and combinations thereof; 20 to 30 parts by weight of green phosphor including $(Sr_{1-x}Ca_x)Ga_2S_4$:Eu ($0 \leq x < 0.2$); and 20 to 30 parts by weight of a red phosphor selected from the group consisting of $Y_2O_3$:Eu, $Y_2O_3$:(Eu,Tb), $Y_2O_2S$:Eu, $Y_2O_2S$:(Eu,Tb), and combinations thereof.

Two phosphor layers 30 may be disposed over one pixel region, or more than two phosphor layers 30 may be disposed over one pixel region. Also, one phosphor layer 30 may be disposed over more than two pixel regions. In all of the three cases, the phosphor layer 30 may be rectangular.

Spacers (not shown) are disposed between the first and second substrates 12 and 14. The spacers uniformly maintain a gap between the first and second substrates 12 and 14.

The light emission device 10 is driven by a voltage that is applied to the cathodes 22, the gate electrodes 26, and the anode. In FIG. 1, the light emission device 10 includes a gate lead line 36 extending from the gate electrodes 26 and an anode lead line 38 extending from the anode.

An electric field is formed around the electron emission regions 28, at pixel regions where a voltage difference between the cathodes 22 and gate electrodes 26 is higher than a threshold value, thereby emitting electrons from the electron emission regions 28. The emitted electrons are accelerated by the high voltage applied to the metallic reflective layer 34, so as to collide with the phosphor layers 30, thereby exciting the phosphor layers 30. A light emission intensity of the phosphor layers 30 at each pixel corresponds to an electron emission amount of the corresponding pixel.

Figure 3:
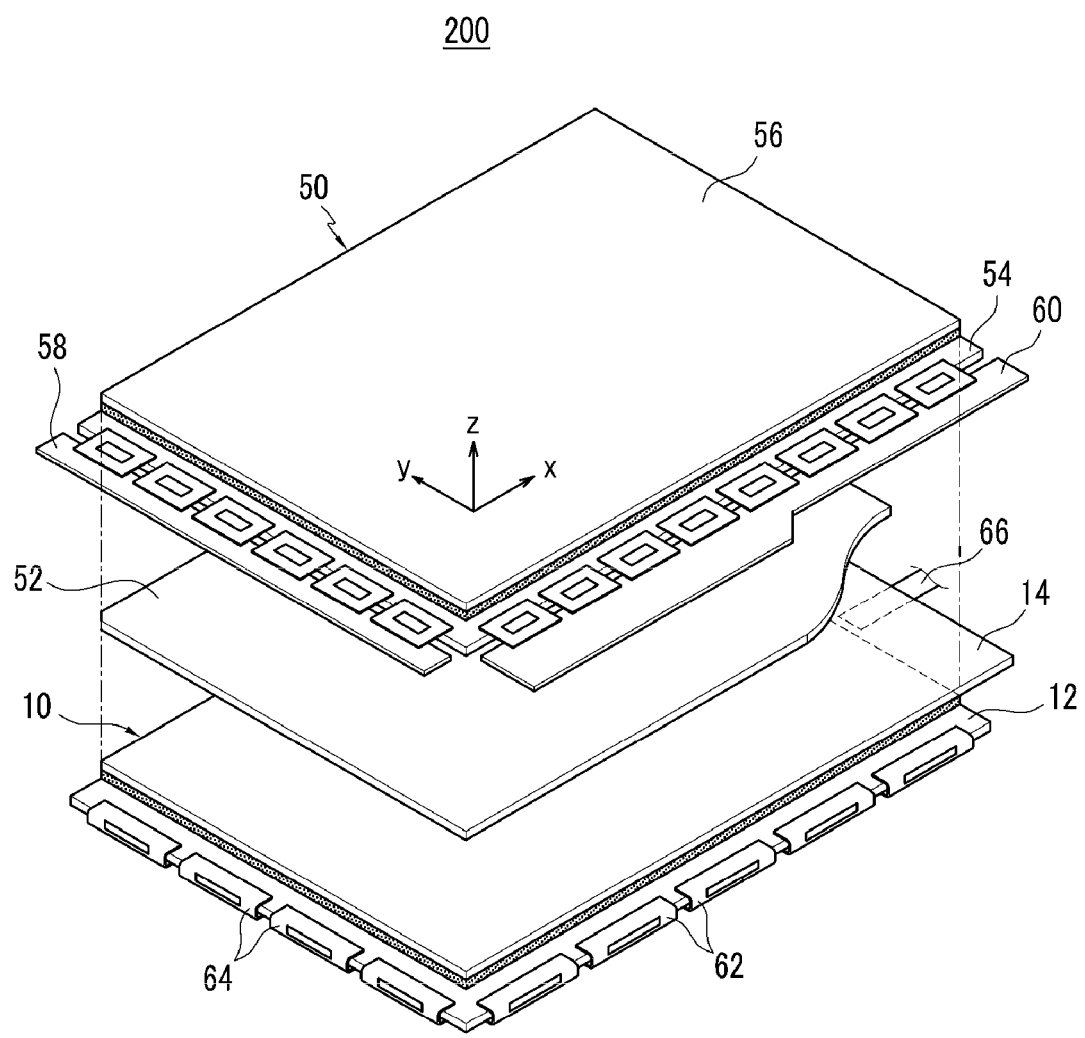
FIG. 3 is a partial exploded perspective view of a display device, according to one exemplary embodiment of the present invention.

FIG. 3 is an exploded perspective view of a display device including a light emission device as a backlight unit, according to one exemplary embodiment of the present invention. Similar elements are assigned the same reference numerals as in FIG. 2.

Referring to FIG. 3, a display device 200, according to one exemplary embodiment of the present invention, includes a light emission device 10, and a display panel 50 located in front of the light emission device 10. A diffuser plate 52, to uniformly diffuse light emitted from the light emission device 10 to the display panel 50, may be located between the light emission device 10 and the display panel 50. The diffuser plate 52 is spaced apart from the light emission device 10, by a predetermined distance.

A liquid crystal panel, or other light-receiving (not-emissive type) display panels, may be used as the display panel 50. In the following description, the display panel 50 is exemplified as a liquid crystal panel.

The display panel 50 includes a lower substrate 54 having a plurality of thin film transistors (TFTs), an upper substrate 56 facing the lower substrate 54, and a liquid crystal layer (not shown) formed between the substrates 54 and 56. A polarizing plate (not shown) is attached to the upper substrate 56 and the lower substrate 54, to polarize the light passing through the display panel 50.

The lower substrate 54 includes transparent pixel electrodes disposed on the internal surface. The transparent pixel electrodes are operated under the control of the TFT of each subpixel. The upper substrate 56 includes a color filter layer and a transparent common electrode disposed on the internal surface thereof. The color filter layer includes a red filter layer, a green filter layer, and a blue filter layer, for each subpixel.

When the TFT of a certain subpixel is turned on, an electric filed is formed between the pixel electrode and the common electrode. A twisting angle, of liquid crystal molecules between the lower substrate 54 and the upper substrate 56, is varied. Accordingly, the light transmittance of the corresponding pixel is varied. The display panel 50 can control the luminance and the color of light emitted from each pixel, through this process.

Referring to FIG. 3, the display device 200 includes a gate printed circuit board assembly 58 to transmit a gate driving signal to the gate electrode of each TFT and a data printed circuit board assembly 60 to transmit a data driving signal to a source electrode of each TFT.

The light emission device 10 includes a number of pixels that is less than the number of pixels of the display panel 50. In other words, one pixel of the light emission device 10 corresponds to two or more of the pixels of the display panel 50. Each pixel of the light emission device 10 emits light in response to a highest gray level of the corresponding pixels of the display panel 50. The light emission device 10 can represent a 2-8 bit gray level at each pixel.

For convenience, the pixels of the display panel 50 are referred as first pixels and the pixels of the light emission device 10 are referred as second pixels. The first pixels and the corresponding second pixel are referred as a first pixel group.

During a driving process of the light emission device 10, a signal control unit (not shown): controls the display panel 50; detects the highest gray level of the first pixel group; operates a gray level required to emit light from the second pixel, in response to the detected high gray level; converts the operated gray level into digital data; generates a driving signal of the light emission device 10, using the digital data; and applies the generated driving signal to the driving electrode of the light emission device 10.

The driving signal of the light emission device 10 includes a driving signal and a data driving signal. One of the cathode and gate electrode described above (for example, the gate electrode) receives a scan driving signal, and the other (for example, the cathode) receives a data driving signal.

A scan printed circuit board assembly (PBA) and a data printed circuit board assembly (PBA), which drive the light emission device 10, may be disposed on the back side of the light emission device 10. Referring to FIG. 3, the display device 200 includes: a first connection member 62 to connect the cathode to the data printed circuit board assembly (PBA); a second connection member 64 to connect the gate electrode to the scan printed circuit board assembly (PBA); and a third connection member 66 to apply an anode voltage to the anode.

As described above, the second pixel of the light emission device 10 is synchronized with the corresponding first pixel group and emits light of a predetermined grayscale, when an image is displayed using the first pixel group. In short, the light emission device 10 provides more light to brighter regions of the image, and provides less light to darker regions. Thus, the display device 200 can increase the dynamic contrast of the image and can improve the quality of the image.

The following examples illustrate the present invention in more detail. However, it is understood that the present invention is not limited by these examples.

Experimental Example 1

Manufacturing of Light Emission Unit

Example 1

A white phosphor was prepared by mixing 46.9 parts by weight of a ZnS:(Ag,Al) blue phosphor, 27.8 parts by weight of a $Sr_{0.9}Ca_{0.1}Ga_2S_4$:Eu green phosphor, and 25.3 parts by weight of a $Y_2O_3$:Eu red phosphor.

A rectangular electrode layer was formed on a substrate, and the above-prepared white phosphor was applied to the surface of the substrate, to thereby prepare a white phosphor layer.

Subsequently, Al was deposited by chemical vapor deposition on the white phosphor layer, to thereby form a metallic reflective layer. The resultant substrate was baked at 480° C., for 0.5 to 1 hour, to thereby prepare a light emission unit.

Example 2

The light emission unit was fabricated according to the same method as in Example 1, except that 47.7 parts by weight of a ZnS:(Ag,Al) blue phosphor, 26.6 parts by weight of a $Sr_{0.9}Ca_{0.1}Ga_2S_4$:Eu green phosphor, and 25.7 parts by weight of a $Y_2O_3$:Eu red phosphor were mixed.

Example 3

The light emission unit was fabricated according to the same method as in Example 1, except that 48.0 parts by weight of a ZnS:(Ag,Al) blue phosphor, 25.7 parts by weight of a $Sr_{0.9}Ca_{0.1}Ga_2S_4$:Eu green phosphor, 26.3 parts by weight of a $Y_2O_3$:Eu red phosphor were mixed.

Example 4

The light emission unit was fabricated according to the same method as in Example 1, except that 48.5 parts by weight of a ZnS:(Ag,Al) blue phosphor, 24.7 parts by weight of a $Sr_{0.9}Ca_{0.1}Ga_2S_4$:Eu green phosphor, and 26.9 parts by weight of a $Y_2O_3$:Eu red phosphor were mixed.

Example 5

The light emission unit was fabricated according to the same method as in Example 1, except that SrGa2S4:Eu for a green phosphor was used instead of $Sr_{0.9}Ca_{0.1}Ga_2S_4$:Eu.

Comparative Example 1

The light emission unit was fabricated according to the same method as in Example 1, except that ZnS:(Cu,Al) for a green phosphor was used instead of $Sr_{0.9}Ca_{0.1}Ga_2S_4$:Eu.

(Measurement 1: Light Emitting Characteristics of Phosphor and Light Emission Unit)

The color temperatures, luminance, color coordinates, and light emitting spectra, of the light emitted from the light emission devices manufactured according to Examples 1 to 5 and Comparative Example 1, were measured using a contact-type photometer (CA-100, produced by the Minolta Company).

Figure 4:
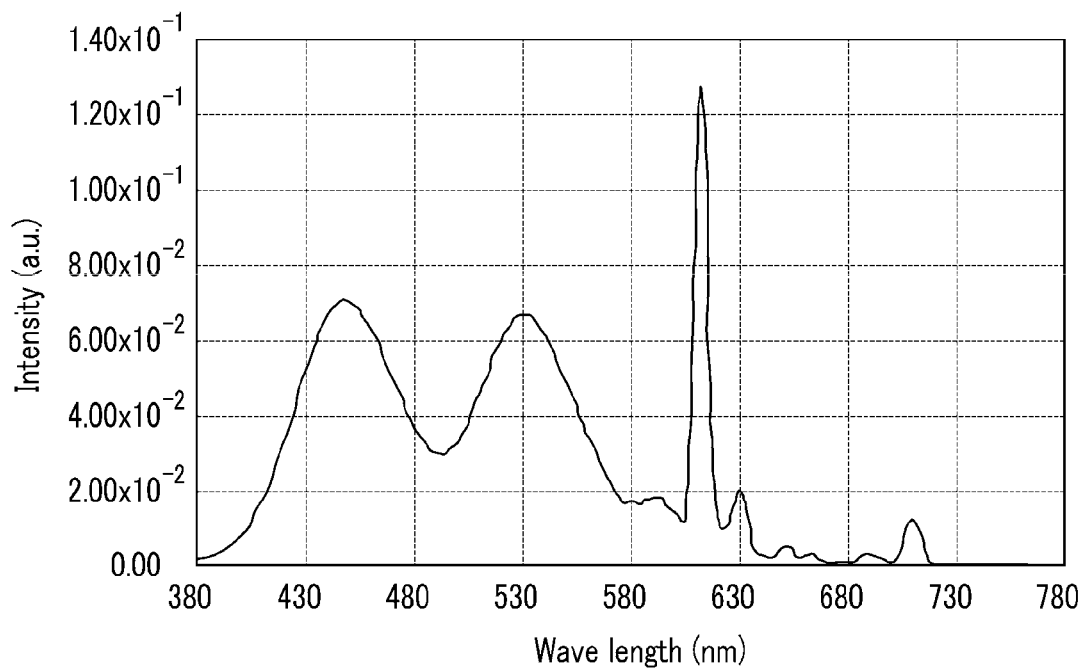
FIG. 4 shows a light emitting spectrum of a white phosphor, according to Example 1 of the present invention.

Table 1 shows the color temperatures, luminance, and color coordinates of the white phosphors according to Examples 1 to 4, and FIG. 4 is a graph showing the light emitting spectrum of the white phosphor according to Example 1.

TABLE 1

| | Color temperature (K) | Luminance (cd/m$^2$) | Color coordinate (x, y) |
| --- | --- | --- | --- |
| Example 1 | 10,156 | 7213 | 0.2608, 0.3235 |
| Example 2 | 10,140 | 7109 | 0.2620, 0.3215 |
| Example 3 | 10,598 | 6811 | 0.2615, 0.3134 |
| Example 4 | 10,581 | 6750 | 0.2641, 0.3091 |

Referring to Table 1 and FIG. 4, the light emission units according to Examples 1 to 4 emit white light, have good luminance, and have color temperatures of about 10,000K, or more.

Figure 5:
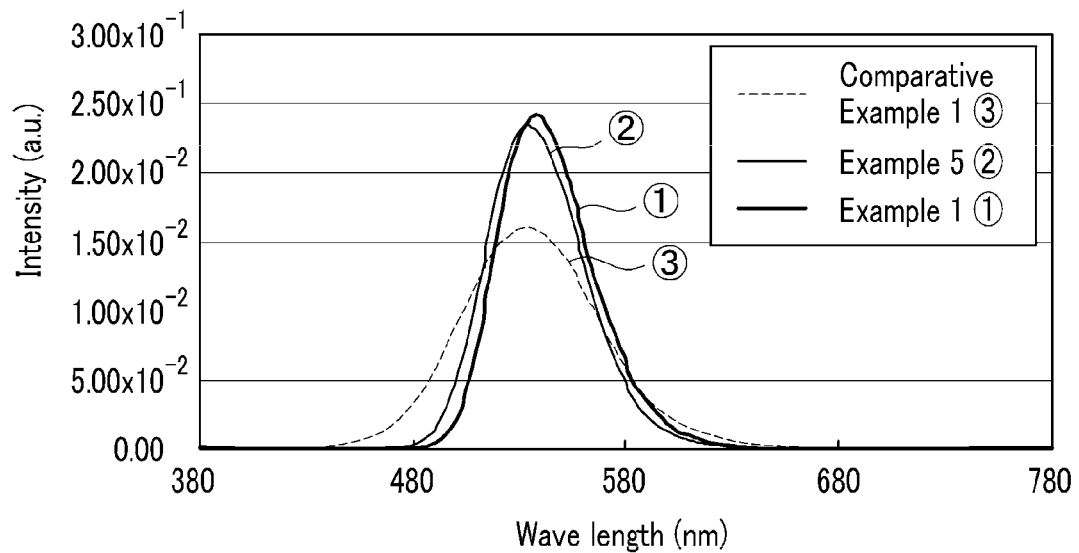
FIG. 5 shows light emitting spectra of the green phosphors, according to Examples 1 and 5 of the present invention and Comparative Example 1.

Table 2 shows a color coordinates and a relative luminance of the green phosphors according to Examples 1 and 5, and Comparative Example 1. The relative luminance is calculated based on the green phosphor according to Comparative Example 1. FIG. 5 is a graph showing light emitting spectra of the green phosphors according to Examples 1 and 5, and Comparative Example 1.

TABLE 2

|  | x coordinate | y coordinate | Relative luminance (%) |
|---|---|---|---|
| Comparative Example 1 | 0.2815 | 0.6055 | 100 |
| Example 5 | 0.2701 | 0.7028 | 117 |
| Example 1 | 0.2833 | 0.6951 | 135 |

Table 2 and FIG. 5 show that the green phosphors of Example 1 and Example 5 had a wider color reproduction than Comparative Example 1.

Experimental Example 2

Manufacturing of Light Emission Unit

Example 6

A white phosphor was fabricated according to the same method as in Example 1, except that 48.1 parts by weight of a ZnS:(Ag,Al) blue phosphor, 23.5 parts by weight of a $Sr_{0.9}Ca_{0.1}Ga_2S_4$:Eu green phosphor, and 26.4 parts by weight of a $Y_2O_3$:Eu red phosphor. A rectangular electrode layer was formed on a substrate, and the above-prepared white phosphor was applied to the surface of the substrate, to thereby prepare a white phosphor layer.

Subsequently, Al was deposited on the white phosphor layer, by a chemical vapor deposition method, to thereby form a metallic reflective layer. The resultant substrate was baked at 480° C., for 0.5 to 1 hour, to thereby prepare a light emission unit.

Example 7

The light emission unit was fabricated according to the same method as in Example 1, except that 46.9 parts by weight of a ZnS:(Ag,Al) blue phosphor, 27.8 parts by weight of a $SrGa_2S_4$:Eu green phosphor, and 25.3 parts by weight of a $Y_2O_3$:Eu red phosphor were used.

Comparative Example 2

The light emission unit was fabricated according to the same method as in Example 1, except that 40.8 parts by weight of a ZnS:(Ag,Al) blue phosphor, 35.8 parts by weight of a ZnS:(Cu,Al) green phosphor, and 23.4 parts by weight of a $Y_2O_3$:Eu red phosphor were used.

(Measurement 2: Light Emitting Characteristics of Phosphor and Light Emission Unit)

The color temperatures, luminance, color coordinates, and light emitting spectra of the light emitted from the light emission units, manufactured according to Examples 6 and 7 and Comparative Example 1, were measured using a contact-type photometer (CA-100, produced by the Minolta Company).

Figure 6:
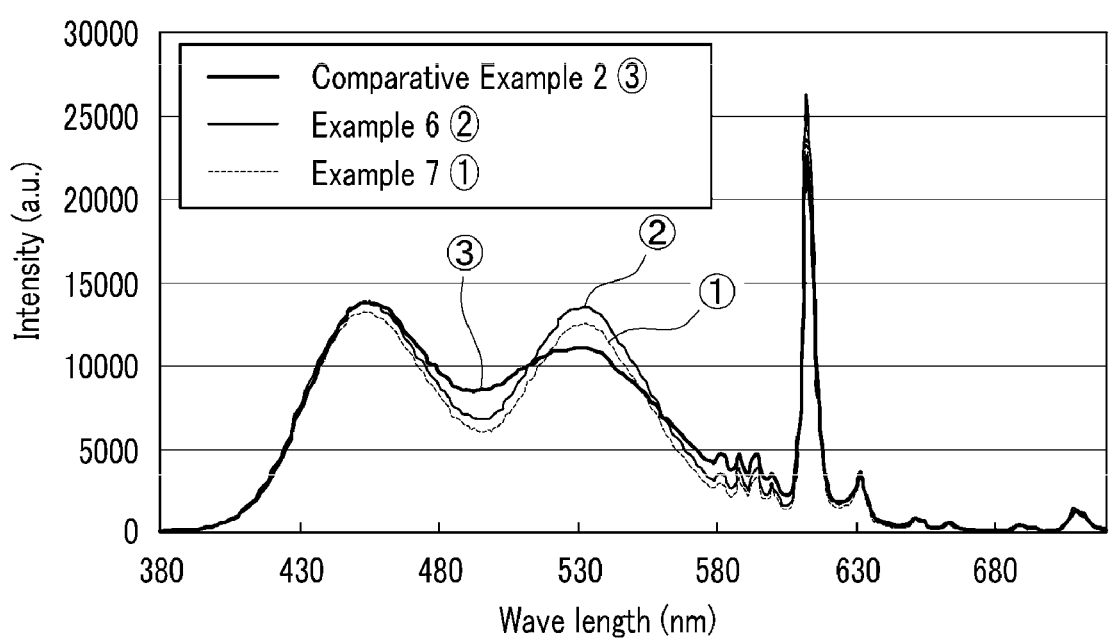
FIG. 6 shows light emitting spectra of the white phosphors, according to Examples 6 and 7 of the present invention and Comparative Example 2.
Figure 7:
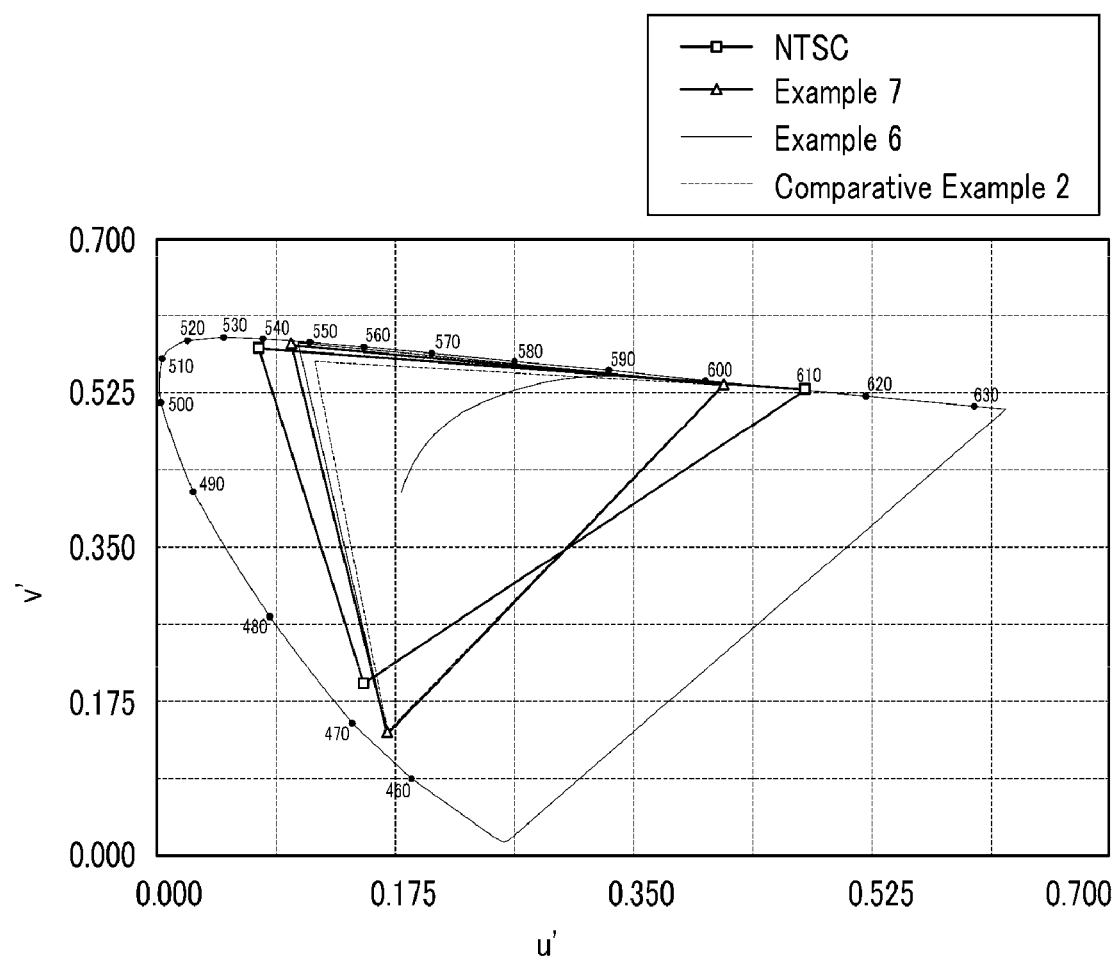
FIG. 7 and FIG. 8 show color reproduction ranges of the white phosphors, according to Examples 6 and 7 of the present invention and Comparative Example 2.
Figure 8:
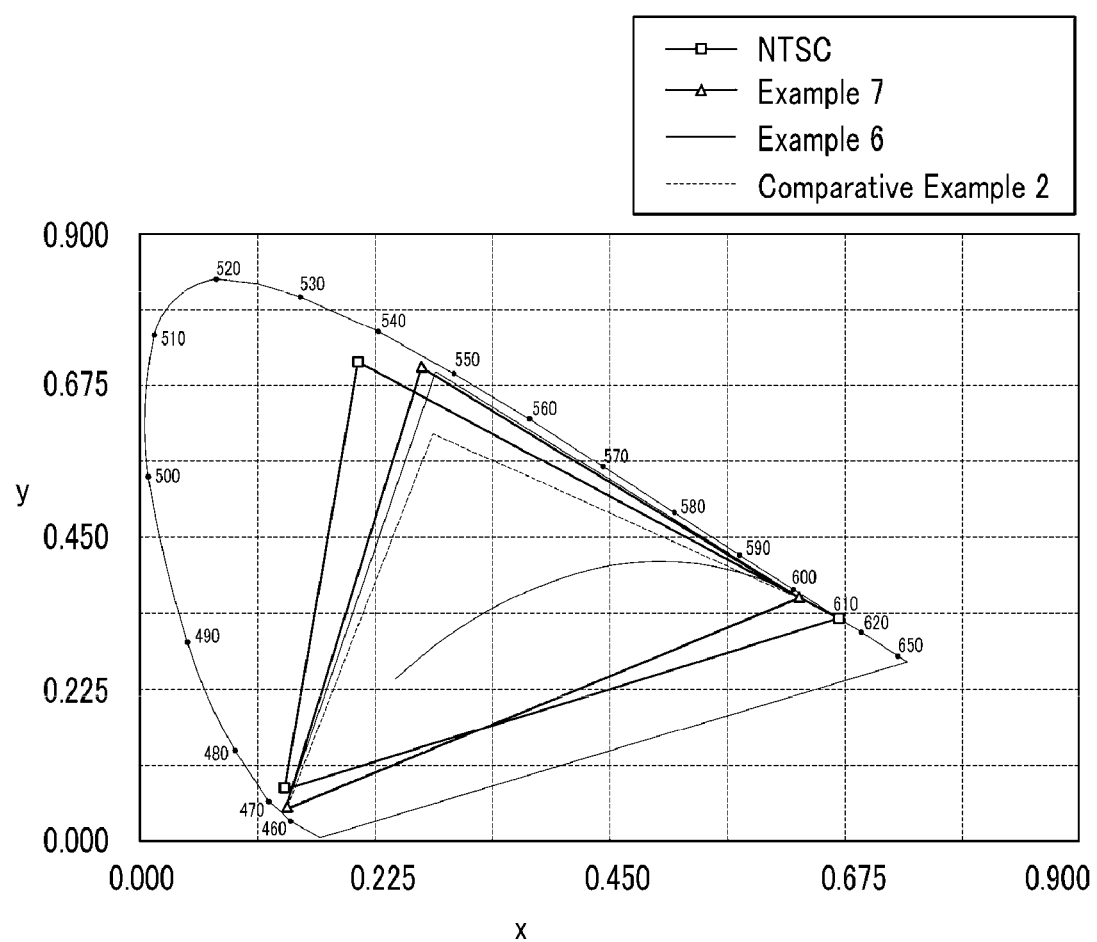

Table 3 shows the color temperatures, luminance, and color coordinates of the white phosphors according to Examples 6 and 7, and Comparative Example 1. FIG. 6 is a graph showing light emitting spectra of the white phosphors according to Examples 6 and 7, and Comparative Example 1, and FIGS. 7 and 8 show color reproduction ranges of the white phosphors according to Examples 6 and 7, and Comparative Example 1. FIGS. 7 and 8 show that the color reproduction ranges of the white phosphors according to Examples 6 and 7, and Comparative Example 1 satisfied a requirement of NTSC (National Television System Committee).

TABLE 3

|  | Color temperature (K) | Luminance (cd/m$^2$) | Color reproduction (relative to NTSC) | Color coordinate (x, y) |
|---|---|---|---|---|
| Comparative Example 1 | 11,378 | 7505 | 72.1% | 0.2523, 0.3157 |
| Example 7 | 10,156 | 7213 | 88.3% | 0.2608, 0.3235 |
| Example 6 | 12,067 | 7345 | 85.8% | 0.2718, 0.277 |

Referring to Table 3, FIGS. 6 to 8, the white phosphors of Example 6 or Example 7 had a 13 to 15% better color reproduction range than Comparative Example 1. A general CCFL has a color reproduction of 72%, while the white phosphor, according to one exemplary embodiment of the present invention, can provide backlight unit having better color reproduction characteristics than a general CCFL.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A white phosphor comprising:
   40 to 50 parts by weight of a blue phosphor selected from the group consisting of ZnS:(Ag,Cl), ZnS:(Ag,Al), ZnS:(Ag,Al,Cl), and a combination thereof;
   20 to 30 parts by weight of a green phosphor $(Sr_{1-x}Ca_x)Ga_2S_4$:Eu $(0 \leq x < 0.2)$; and
   20 to 30 parts by weight of a red phosphor selected from the group consisting of $Y_2O_3$:Eu, $Y_2O_3$:(Eu,Tb), $Y_2O_2S$:Eu, $Y_2O_2S$:(Eu,Tb), and a combination thereof.

2. The white phosphor of claim 1, wherein the white phosphor comprises 45 to 50 parts by weight of the blue phosphor, 22 to 29 parts by weight of the green phosphor, and 22 to 29 parts by weight of the red phosphor.

3. The white phosphor of claim 1, wherein the white phosphor comprises 46 to 49 parts by weight of the blue phosphor, 23 to 28 parts by weight of the green phosphor, and 24 to 29 parts by weight of the red phosphor.

4. The white phosphor of claim 1, wherein the white phosphor has a color temperature ranging from 10,000K to 13,000K, when excited by an electron beam.

5. A light emission device comprising:
   opposing first and second substrates;
   an electron emission unit disposed on an inner surface of the first substrate; and
   a light emission unit disposed on an inner surface of the second substrate, comprising white phosphor layers disposed on the inner surface of the second substrate, the white phosphor comprising,
   40 to 50 parts by weight of a blue phosphor selected from the group consisting of ZnS:(Ag,Cl), ZnS:(Ag,Al), ZnS:(Ag,Al,Cl), and a combination thereof,
   20 to 30 parts by weight of a green phosphor $(Sr_{1-x}Ca_x)Ga_2S_4$:Eu $(0 \leq x < 0.2)$, and
   20 to 30 parts by weight of a red phosphor selected from the group consisting of $Y_2O_3$:Eu, $Y_2O_3$:(Eu,Tb), $Y_2O_2S$:Eu, $Y_2O_2S$:(Eu,Tb), and a combination thereof.

6. The light emission device of claim 5, wherein the white phosphor comprises 45 to 50 parts by weight of the blue phosphor, 22 to 29 parts by weight of the green phosphor, and 22 to 29 parts by weight of the red phosphor.

7. The light emission device of claim 5, wherein the white phosphor comprises 46 to 49 parts by weight of the blue phosphor, 23 to 28 parts by weight of the green phosphor, and 24 to 29 parts by weight of the red phosphor.

8. The light emission device of claim 5, wherein the white phosphor has a color temperature ranging from 10,000K to 13,000K, when excited by an electron beam.

9. The light emission device of claim 5, wherein the light emission unit comprises a metallic reflective anode disposed on the white phosphor layers.

10. The light emission device of claim 5, wherein the light emission unit comprises
an anode comprising:
a transparent conductive layer disposed between the second substrate and white phosphor layers; and
a metallic reflective layer disposed on the white phosphor layers.

11. The light emission device of claim 5, wherein the electron emission unit comprises:
cathodes disposed in rows on the first substrate;
an insulating layer disposed on the cathodes;
gate electrodes disposed in columns on the insulating layer and extending across the rows of cathodes; and
electron emission regions disposed in the insulating layer and electrically connected to the cathodes.

12. The light emission device of claim 11, wherein the electron emission regions comprise one selected from the group consisting of a carbon-based material, a nanometer-sized material, and a combination thereof.

13. A liquid crystal display (LCD) comprising:
a light emission device comprising,
opposing first and second substrates,
an electron emission unit disposed on an inner surface of the first substrate, and
a light emission unit comprising white phosphor layers disposed on an inner surface of the second substrate, the white phosphor comprising,
40 to 50 parts by weight of a blue phosphor selected from the group consisting of ZnS:(Ag,Cl), ZnS:(Ag,Al), ZnS:(Ag,Al,Cl), and a combination thereof,
20 to 30 parts by weight of a green phosphor $(Sr_{1-x}Ca_x)Ga_2S_4:Eu(0 \leq x < 0.2)$, and
20 to 30 parts by weight of a red phosphor selected from the group consisting of $Y_2O_3:Eu$, $Y_2O_3:(Eu,Tb)$, $Y_2O_2S:Eu$, $Y_2O_2S:(Eu,Tb)$, and a combination thereof; and
a liquid crystal panel assembly facing the light emission device, to display an image by selectively transmitting light emitted from the light emission device.

14. The liquid crystal display of claim 13, wherein the white phosphor comprises 45 to 50 parts by weight of the blue phosphor, 22 to 29 parts by weight of the green phosphor, and 22 to 29 parts by weight of the red phosphor.

15. The liquid crystal display of claim 13, wherein the white phosphor comprises 46 to 49 parts by weight of the blue phosphor, 23 to 28 parts by weight of the green phosphor, and 24 to 29 parts by weight of the red phosphor.

16. The liquid crystal display of claim 13, wherein the white phosphor has a color temperature ranging from 10,000K to 13,000K, when excited by an electron beam.

17. The liquid crystal display of claim 13, wherein the light emission unit further comprises a metallic reflective anode disposed on the phosphor layers.

18. The liquid crystal display of claim 13, wherein the light emission unit further comprises an anode comprising: a transparent conductive layer disposed between the inner surface of the second substrate and phosphor layers; and
a metallic reflective layer disposed on the phosphor layers.

19. The liquid crystal display of claim 13, wherein the electron emission unit comprises:
a first electrode disposed in rows on the first substrate;
an insulating layer disposed on the first electrode;
a second electrode disposed in columns on the insulating layer and extending across the rows of first electrode; and
electron emission regions disposed within the insulating layer and electrically connected to the first electrode.

20. The liquid crystal display of claim 19, wherein the electron emission regions comprise one selected from the group consisting of a carbon-based material, a nanometer-sized material, and a combination thereof.

* * * * *